R. T. PARK.
APPARATUS FOR CUTTING LEMONS AND THE LIKE.
APPLICATION FILED MAY 20, 1914.

1,124,797.

Patented Jan. 12, 1915.

Witnesses.
L. E. Witham.
W. Wallace Nairn Jr.

Inventor
Richard T. Park
By
Sowell & Sowell
Attorneys

UNITED STATES PATENT OFFICE.

RICHARD THOMAS PARK, OF SOUTH MELBOURNE, VICTORIA, AUSTRALIA.

APPARATUS FOR CUTTING LEMONS AND THE LIKE.

1,124,797.  Specification of Letters Patent.  Patented Jan. 12, 1915.

Application filed May 20, 1914. Serial No. 839,761.

*To all whom it may concern:*

Be it known that I, RICHARD THOMAS PARK, a subject of the King of Great Britain and Ireland, and a resident of the city of South Melbourne, in the county of Bourke, State of Victoria, Commonwealth of Australia, whose post-office address is 137 York street, in the said city of South Melbourne, have invented a certain new and useful Improved Apparatus for Cutting Lemons and the like, of which the following is a specification.

This invention relates to apparatus for cutting lemons and the like and then extracting the pulp and juice therefrom and has for its object to provide an extremely simple, cheap, and efficient apparatus whereby lemons and other fruit may be cut and the juice and pulp be extracted without inconvenience.

My prior invention disclosed by United States patent application Ser. No. 833,406 dated April 21, 1914 comprises a machine whereby the fruit is cut and the juice and pulp extracted therefrom mechanically. Such a machine, however, is practically limited to factory use wherein comparatively large quantities of fruit are used.

The present invention provides apparatus which is equally useful in either factories, shops, or refreshment rooms, it being extremely serviceable for treating either small or large quantities of fruit.

It consists essentially of a cutting device, guarding the fingers against accidental injury by the cutting device, and in extracting and collecting the juice from the fruit.

Figure 1:
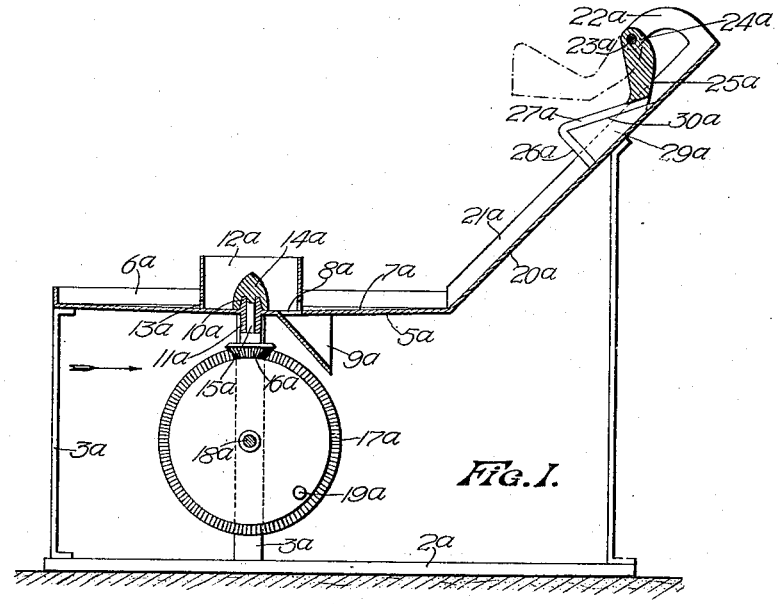
Figure 2:
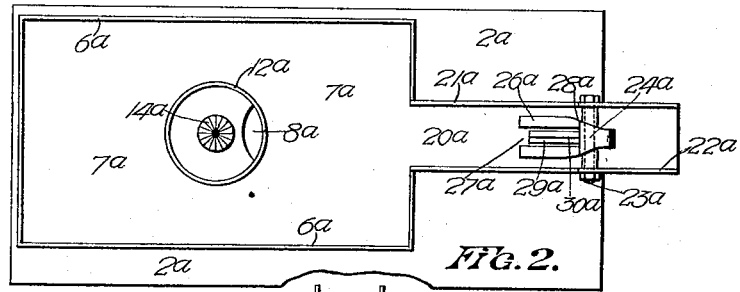
Figure 3:
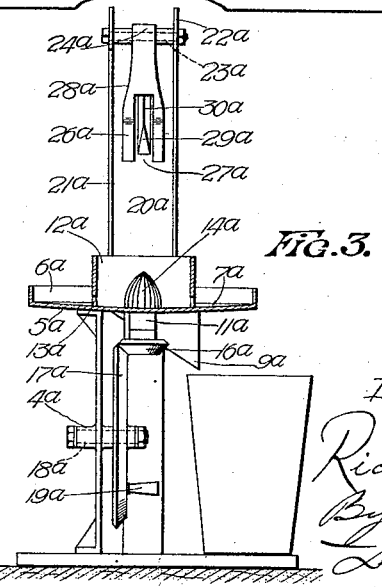

Referring to the drawings which form a part of this specification:—Figure 1 is a side sectional elevation of the invention. Fig. 2 is a plan of the invention. Fig. 3 is an end sectional elevation looking in the direction of the arrow, Fig. 1.

The invention includes a base plate $2^a$ above which are upstanding supports $3^a$ one of which is provided with a bearing $4^a$. Carried by the supports $3^a$ is a table $5^a$ having around its edges upstanding lips or flanges $6^a$. The upper surface $7^a$ of the table $5^a$ is inclined toward a drainage hole $8^a$ therein. Beneath the drainage hole is a delivery chute $9^a$ beneath which a glass, bucket or any other receptacle may be placed. Upstanding from the table $5^a$, adjacent the drainage hole $8^a$, is a cone-shaped bush $10^a$ beneath which is a bearing $11^a$. Encircling the bush $10^a$ is an upstanding collar $12^a$ having therethrough passageways $13^a$.

Within the collar is a rotary extractor $60$ consisting of a dome shaped head $14^a$ having therein a cone-shaped recess into which the cone-shaped bush $10^a$ passes. Depending from the head $14^a$ is a spindle $15^a$ passing through the bush $10^a$ and the bearing $11^a$ and having mounted upon its lower end a bevel pinion $16^a$. Engaging the pinion $16^a$ is a bevel wheel $17^a$ mounted upon a shaft $18^a$ which is mounted in the bearing $4^a$. Protruding from the wheel $17^a$ is a handle $19^a$.

Extending from the table $5^a$ is an inclined chute $20^a$ having side lips or flanges $21^a$. At the upper end of each side lip $21^a$ is disposed an overhanging lug $22^a$. Mounted in the lugs $22^a$ and extending therebetween is a pivot pin $23^a$.

Pivoted to the pivot pin $23^a$ is the upper portion $24^a$ of a finger guard having an undercut lifting surface $25^a$. Integral with the upper portion $24^a$ are two legs $26^a$ having therebetween a slot or passageway $27^a$. The sides $28^a$ of the finger guard diverge outwardly as shown in Figs. 2 and 3.

Secured to the inclined chute $20^a$ beneath the finger guard is a knife $29^a$ having an inclined cutting edge $30^a$. The knife may be retained in any suitable manner and, if desired, may be removable.

With this invention the operator places the lemon against the surface $25^a$ of the finger guard. The lemon is then grasped by the hands at each end and drawn down the inclined chute $20^a$. As it moves downwardly the finger guard pivots upon the pivot pin $23^a$ and rises and the lemon encounters the cutting edge $30^a$ of the knife $29^a$. As it proceeds downwardly the said knife cuts the lemon into two pieces. Any juice passing from the fruit travels down the chute $20^a$ and across the sloping upper surface $7^a$ of the table $5^a$, passing through the drainage hole $8^a$. The operator may now take one piece of the lemon and press it upon the dome shaped head $14^a$ of the rotary extractor. The bevel wheel $17^a$ is now turned by the handle $19^a$ and the extractor rotates. The operator presses the piece of the lemon down upon the head as it is rotating thereby withdrawing all the juice and pulp of the fruit from the peel thereof. The juice and pulp passes through the drainage hole 8ᵃ and is prevented from splashing or scattering outwardly by means of the collar 12ᵃ. If desired, instead of extracting the juice and pulp from the fruit immediately it is cut, a number of lemons may be successively severed each into two pieces by the knife 29ᵃ, the pieces being placed upon the sloping surface 7ᵃ of the table 5ᵃ, around the collar 12ᵃ, and between it and the lips or flanges 6ᵃ. Any juice passing from the fruit drains through the hole 8ᵃ and chute 9ᵃ into a suitable vessel beneath the said chute. After cutting a number of lemons the operator may rotate the bevel wheel 17ᵃ placing the pieces of lemon in succession upon the dome shaped head 14ᵃ of the rotary extractor.

It is obvious that immediately a lemon has passed the knife 29ᵃ beneath the finger guard the same will fall by gravity thereby preventing the fingers from encountering the said knife. The outwardly diverging sides 28ᵃ serve to direct the fingers grasping the lemon away from the knife 29ᵃ while the finger guard is rising.

It will be apparent to those skilled in the art that a number of appliances as described may be placed side by side for use in factories all of the extractors being driven from a common shaft by power. Or the apparatus could be placed back to back, the extractors still being power driven. Further, an extractor may be provided for each chute and knife or a plurality of extractors may be used for each knife. Further, a single table may be used having a plurality of extractors and knives and a single drainage hole. In addition, the shaft of the apparatus illustrated could be driven or rotated by a treadle or by power. It is also to be understood that although a lemon is herein specified the apparatus is not limited to use therewith but may be used with other fruits and certain classes of vegetables.

Having now described my invention what I claim as new and desire to secure by Letters Patent is:—

1. In an apparatus for cutting lemons and the like, the combination of a chute, a knife mounted longitudinally thereof, and a guard movably connected with said chute over said knife and adapted to be moved away from the knife by the lemon as the latter is drawn past the knife and along the chute.

2. In combination, a chute, a longitudinally disposed knife fixed in said chute, and a finger guard pivotally mounted over the knife in said chute and slotted to embrace the knife, and adapted to be lifted by the fruit as the latter is moved past the knife and along the chute, substantially as described.

3. In combination, a chute, a longitudinally disposed knife in said chute, and a slotted finger guard movably connected to the chute and adapted to be raised by the fruit drawn along the chute, said guard having divergent portions adapted to direct the fingers away from the knife as the fruit is drawn manually past the guard and along the chute, substantially as described.

4. In combination, a chute, a longitudinally disposed knife fixed in said chute, and a finger guard over the knife having an upstanding portion pivotally connected to the sides of the chute and a slotted portion to accommodate the knife, said guard being raised by the fruit as the latter is drawn along the chute beneath the guard and past the knife, substantially as described.

In testimony whereof I have hereunto affixed my signature in the presence of two subscribing witnesses.

RICHARD THOMAS PARK.

Witnesses:
 CECIL M. PLASTRIU,
 FRANK H. OAIN.